(12) United States Patent
Marinelli

(10) Patent No.: US 6,533,341 B2
(45) Date of Patent: Mar. 18, 2003

(54) ADJUSTABLE PIVOTING MEANS FOR A VEHICLE SEAT BACKREST

(75) Inventor: Francesco Marinelli, San Secondo di Pinerolo (IT)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/892,827

(22) Filed: Jun. 27, 2001

(65) Prior Publication Data

US 2002/0070578 A1 Jun. 13, 2002

(30) Foreign Application Priority Data

Jun. 30, 2000 (IT) ........................................ TO00A0649

(51) Int. Cl.$^7$ ................................................ B60N 2/22
(52) U.S. Cl. .................. 296/65.16; 296/69; 297/354.1; 297/383
(58) Field of Search ................................ 296/63, 65.01, 296/65.05, 65.16, 69; 297/383, 354.1, 342

(56) References Cited

U.S. PATENT DOCUMENTS

| | | | | |
|---|---|---|---|---|
| 1,685,770 A | * | 10/1928 | Bowen | 297/326 |
| 1,966,343 A | * | 7/1934 | Hallowell et al. | 297/327 |
| 4,763,952 A | * | 8/1988 | Gaudreau, Jr. | 297/217.2 |
| 6,257,664 B1 | * | 7/2001 | Chew et al. | 297/284.9 |

* cited by examiner

*Primary Examiner*—D. Glenn Dayoan
*Assistant Examiner*—Patricia L. Engle
(74) *Attorney, Agent, or Firm*—Bill C. Panagos

(57) ABSTRACT

The backrest of a rear seat of a motor vehicle presents a frame, which lower fastening means pivoting on the body of the motor vehicle on a transverse axis and which upper fastening means to the body can be released to rotate the backrest forwards for extending the motor vehicle luggage compartment. The lower pivots are shaped so to pivot the backrest on the body of the motor vehicle with the lower part of the backrest arranged either in a first most advanced operative position or in a second most retracted operative position.

16 Claims, 3 Drawing Sheets

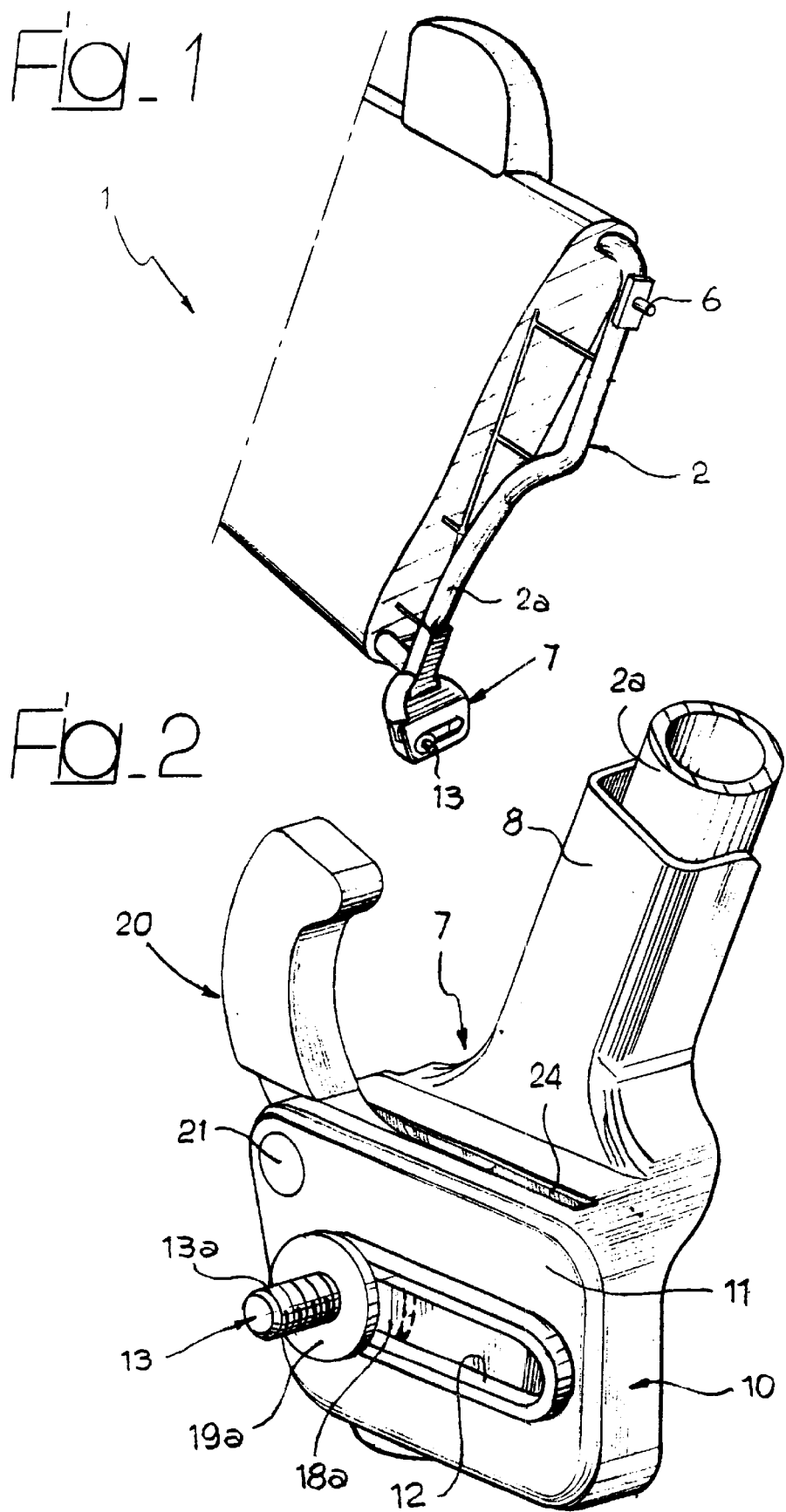

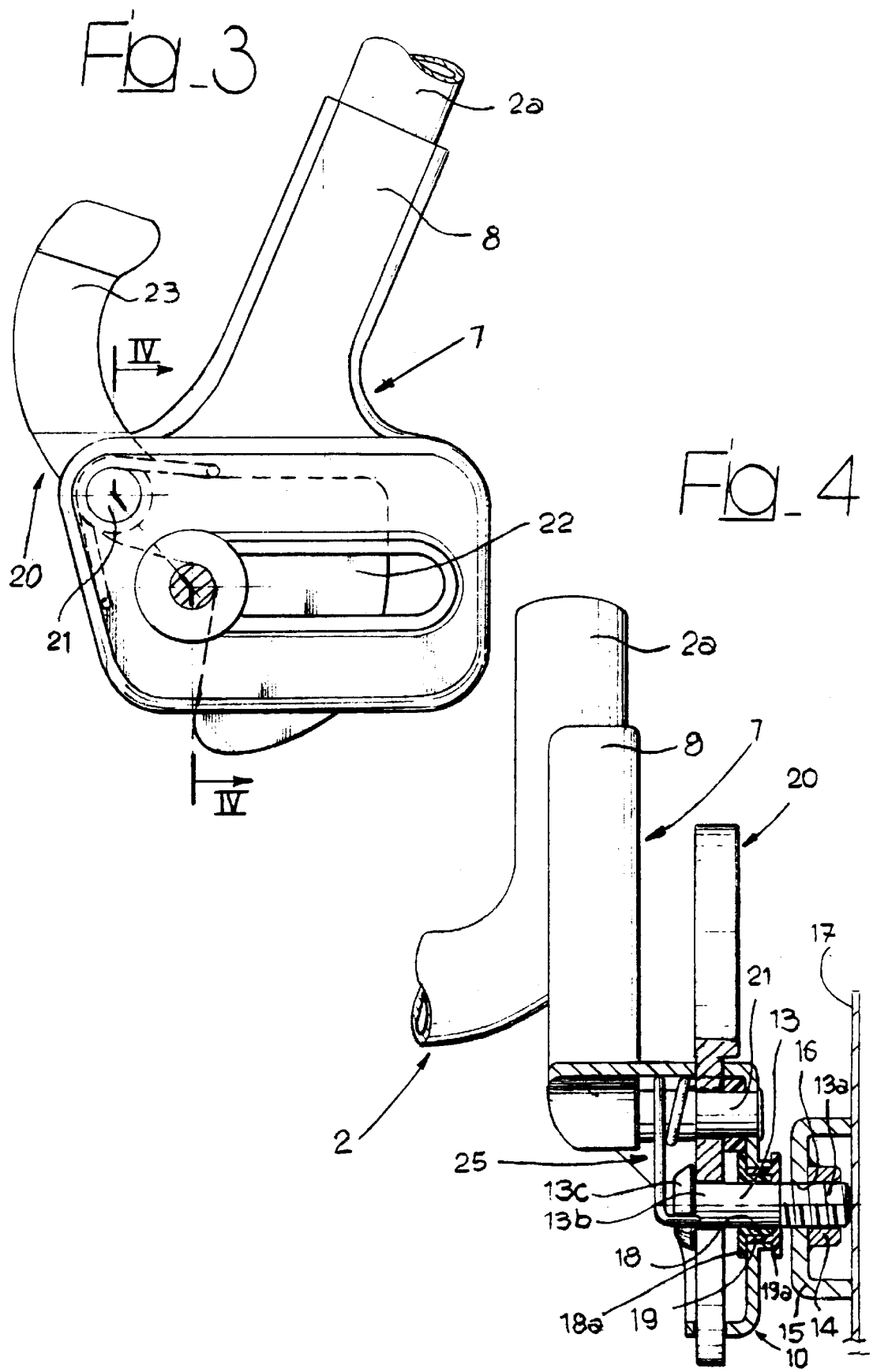

ADJUSTABLE PIVOTING MEANS FOR A VEHICLE SEAT BACKREST

DESCRIPTION

Figure 5:
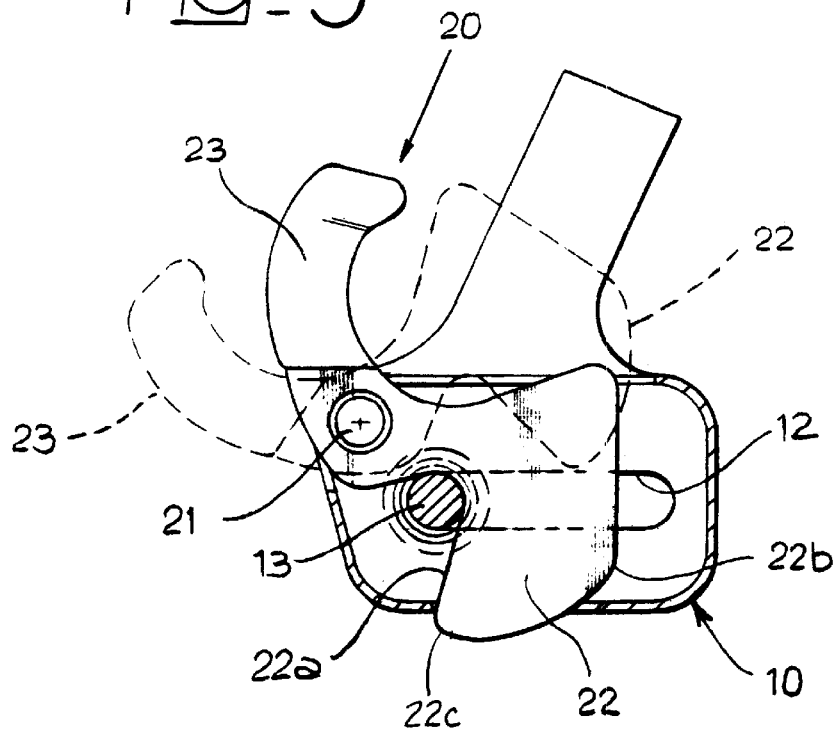

This invention relates to the rear seats of a motor vehicle, of the type comprising a backrest with a frame, which lower part is equipped with means for connecting to the body of the motor vehicle pivoting on a transverse horizontal axis of the motor vehicle, and which upper part is equipped with means for fastening to the body of the motor vehicle, which can be released to allow the rotation of the backrest forward, so to take it over the cushion, in a condition in which the rear side of the backrest forms an extension of the luggage compartment of the motor vehicle.

The purpose of this invention is to obtain a rear seat of the type described above, presenting a relatively simple and low cost structure, moreover permitting easy and rapid attainment of the various operative positions of the backrest, to adapt the seat in optimal way to the specific comfort requirements of the user and to obtain, at the same time, a different degree of extension of the capacity of the luggage compartment.

In order to attain this result, this invention relates to a rear seat of a motor vehicle of the type described above, characterised in that said lower pivoting means are shaped so to join the backrest to the body of the motor vehicle with the lower part of the backrest arranged in a first more advanced operative position or in a second more retracted operative position, and in that said lower pivoting means comprise:

- two lower lateral supports, fastened to the frame of the backrest, each presenting a slot, which is substantially parallel to the longitudinal direction of the motor vehicle, in which a respective joint pin slides, the joint pin being fastened to an anchoring element connected to the body of the motor vehicle, and,
- two hook fastening elements, pivoting each on the respective lower lateral support, and held back by elastic means in an operative position in which each hooked element locks the respective pin of either one end or the other of said slot.

Thanks to the arrangement described above, the lower part of the backrest can be moved rapidly in the longitudinal direction, between the two aforesaid operative positions. This possibility of adjustment can be used to adapt the backrest in an optimal way either to the specific needs of the user or to the needs in terms of luggage compartment capacity. For example, a tall passenger can position the lower part of the backrest in its most retracted position, to obtain more leg room. Conversely, the lower part of the backrest can be taken to its most advanced position to slightly increase the luggage compartment capacity. In both positions, the backrest can be pivoted on the two lower pivoting pins, after releasing the hooks on the upper part of the backrest fastening to the body, to fold the backrest on the cushion so to considerably extend the luggage compartment. If a head restraint is fitted on the rear seat backrest, the backrest can be positioned in its most retracted position to facilitate folding, so to avoid any possible interference between the rear seat head restraints and the backrests of the front seats of the motor vehicle.

In a preferred form of embodiment, a guide bushing slides in the slot of each lower lateral support, and receives the respective pivoting pin, when this is bolted to the body during backrest assembly. Furthermore, each fastenig element pivots on the respective lateral support. One extremity of the fastening element is shaped as a book, presenting an internal convex surface and an external edge surface, which co-operate with the bushing of the respective pivoting pin to lock the pin in said slot, respectively either in one position at the extremity of the slot or the other, also ensuring an automatic recovery of play for silent device operation.

In said preferred form of embodiment, the elastic means, recalling each hook fastening element to the respective engagement position, consist of a wire spring wound on an auxiliary pivoting pin of the fastening element, which extremities are fastened to the fastening element and to the casing, respectively.

Moreover, preferably, each lateral support presents an auxiliary opening, which engages one extremity of the hook portion when the fastening element is in its operative position, so to create an additional area of contrast of the hook element against the casing, whereby ensuring a greater resistance of the structure to loads which may be applied during use.

Naturally, also the upper means connecting the upper part of the backrest of the seat to the body can be constructed in a way similar to the lower connection means described above. In this case, both the upper part and the lower part of tie backrest of the motor vehicle can be positioned in two different operative positions, for a total of four different possible combinations, according to the principles forming the object of a previous patent application no. TO99A001178 by the Applicant, deposited on Dec. 30, 1999 and secret at this time.

Figure 6:
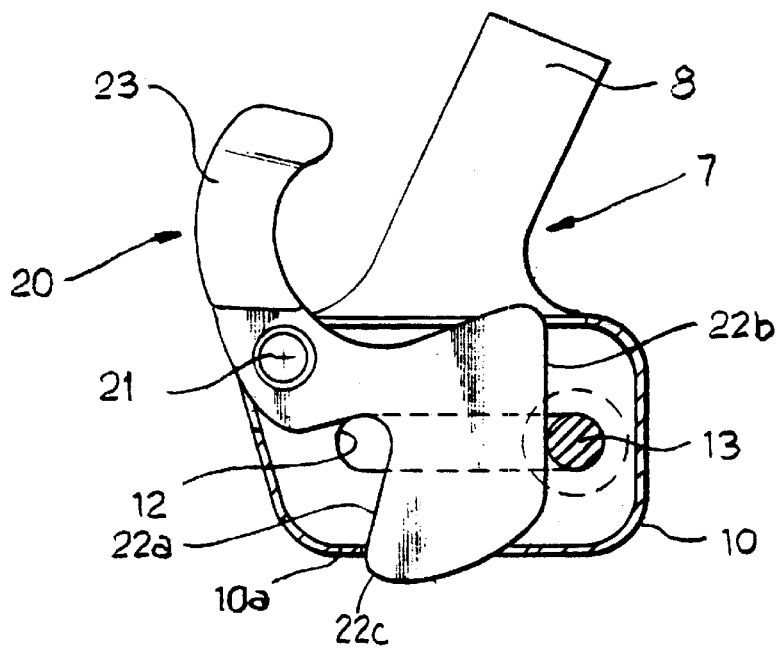

This invention will be better explained by the following detailed descriptions with reference to the accompanying figure as non-limiting example, whereas:

FIG. 1 is a partial cross-section view of the rear seat backrest of a motor vehicle according to this invention, FIG. 2 is a prospective view in extended scale of a detail in FIG. 1, FIG. 3 is a lateral elevated view of the detail in FIG. 2, FIG. 4 is a cross-section view according to line IV—IV of FIG. 3, and, FIGS. 5 and 6 are cross-section views illustrating the fastening element of the device according to this invention in two different operative conditions of use.

In FIG. 1, numeral 1 generally indicates the backrest of a rear seat of a motor vehicle, including a frame 2. The backrest is of the type in which the lower part of the backrest pivots on the body of a motor vehicle on a transverse axis with respect to the longitudinal direction of the motor vehicle, and which upper part of the backrest is equipped with fastening means to the body, which can be disengaged to rotate the backrest forwards on the pivoting axis, to fold it over the cushion (not illustrated) of the rear seat, so as to extend the capacity of the luggage compartment of the motor vehicle. In the drawings, the means for fastening the upper part of the backrest to the body are not illustrated. However, FIG. 1 shoes a lateral pin 6 projecting from one side of the upper part of the backrest which is destined to co-operate with a fastening device of any known kind (not illustrated) anchored to the body.

In the preferred form of embodiment of this invention illustrated in the drawings, the frame of the backrest 2 includes two lateral parts 2a (only the left-hand side of the backrest is shown in FIG. 1: the right-hand side of the backrest is equal and symmetric to the side shown), which lower extremity is welded to a metallic support 7 (see FIG. 2), which includes a channel portion 8 welded over the tubular extremity 2a of the frame and a boxed portion 10, which internal side is open, with an external lateral side 11, where a slot 12 extends essentially in parallel to the longitudinal direction of the motor vehicle.

On each side of the backrest, the lower part pivots on the body of the motor vehicle on a pivoting pin 13 (see FIG. 4) which is inserted through the slot 12 and bolted to the body during backrest assembly. Each of the two pins 13 (as previously mentioned, the drawings only show the left-hand side of the backrest: the right-hand side, not illustrated, is equal and symmetric to the side shown) has a threaded extremity 13a which is screwed into a nut 14 welded in a support 15 with a hole 16 for engaging a pin 13 welded, or otherwise fastened, to the lateral side 17 of the body of the motor vehicle.

Numeral 20 generally indicates a hook fastening element pivoting on support 7 on an auxiliary pivoting pin 21 parallel to the pin 13.

The hook fastening element 20 (see FIGS. 3, 5 and 6) presents a hooked portion 22 arranged inside the casing 10 and a clasping portion 23 projecting outside the casing 10 through an extremity of an upper opening 24 of the casing.

The fastening element 20 is recalled to an engagement position of pin 13 (illustrated with a solid line in FIGS. 5 and 6) by a wire spring 25 wound on a pin 21, which extremity (one of which is visible in FIG. 4) is connected respectively to element 20 and to the side of the casing 10.

In its operative engagement position, the fastening element 20 looks the pin 13 either at the most advanced extremity (with reference to the longitudinal direction of the motor vehicle) of the slot 12 or at the most retracted extremity of said slot (see FIG. 6) In the first case, the fastening element 20 engages the pin 13 with an internal grooved surface 22a of the hook portion. In the second case, the hook portion 22 engages the pin 13 with its external side surface 22b (see FIG. 6). Advantageously, the surfaces 22a, 22b present cam profiled portions, ensuring correct engagement of the fastening element 20 over the pin 13, with automatic recovery of play, for silent device operation. The user can grasp the grip portion 23 and rotate the fastening element 20 on the respective pivoting pin 21, against the action of the spring 25, so to move the fastening element into its disengaged position, illustrated with a dotted line in FIG. 5. In this way, the operator can easily and rapidly change the relative position of the casing 10 with respect to the pin 13. In the condition illustrated in FIG. 5, the casing 10, and, consequently, the lower part of the backrest, is in the most retracted position with respect to the pin 13, which position is fixed with respect to the body of the motor vehicle. In the condition illustrated in FIG. 6, the lower part of the backrest, on the contrary, is in the most advanced position. When the position of the lower part of the backrest is shifted from the condition illustrated in FIG. 5 to the condition illustrated in FIG. 6, the entire backrest rotates on the upper pivoting axis, defined by the two lateral pins 6 engaged in the respective fastening means. Furthermore, regardless of the fastening condition of the lower part of the backrest, when the fastening means of the upper part of the backrest to the body are released, the entire backrest can rotate on the two pins 13, so to fold on the cushion and extend the luggage compartment of the motor vehicle.

According to an additional characteristic, the hook portion 22 ends with a tip 22c, which engages through a lower opening 10a in the casing 10 when the fastening element 20 is in engaged position. In this way, in locked condition, the fastening element 20 is supported by the support 7 both at the auxiliary pin 21 and on the edge of the opening 10a, i.e. in two points located on the two opposite sides with respect to the pin 13.

As mentioned above, the user can arrange the lower part of the backrest either in the most advanced position or in the most retracted position, according to the user's height (taller passengers will sit more comfortably with the lower part of the backrest in the most retracted position, because this configuration offers more resting surface for the thighs) and the loading requirements of the luggage compartment (the available space will be slightly extended when the lower part of the backrest is in its most advanced position).

Naturally, the device illustrated herein can be used in combination with a device fastening the upper part of the backrest to the body which also presents two or more adjustable operative positions, as illustrated in the aforesaid patent application by the Applicant.

Naturally, numerous changes can be implemented to the construction and forms of embodiment of the invention herein envisaged, all comprised within the context of the concept characterising this invention, as defined by the following claims.

What is claimed is:

1. A rear seat of a motor vehicle, comprising a backrest with a frame, lower pivoting mechanisms pivoting on the body of the motor vehicle on an axis, which is movable horizontally with respect to the longitudinal direction of the motor vehicle, and an upper fastening mechanism for fastening the backrest to the body of the motor vehicle, which can be released to rotate the backrest forward to a position in which the rear side of the backrest forms an extension of the floor of the luggage compartment of the motor vehicle, wherein said lower pivoting mechanisms are configured to enable pivoting of the backrest on the body of the motor vehicle with a lower part of the backrest arranged in either a first most advanced operative position or in a second most retracted operative position, and wherein each lower pivoting mechanism comprises:

a lower lateral support fastened to the frame of the backrest and presenting a slot, which is substantially parallel to the longitudinal direction of the motor vehicle, and in which a respective joint pin slides, the joint pin being fastened to an anchoring element connected to the body of the motor vehicle, and a hook fastening element pivoting on the respective lower lateral support, and held back by an elastic device in an operative position in which the hooked element locks the respective pin at either one end or the other of said slot.

2. The seat according to claim 1, wherein a guide bushing sides in each lower lateral support, and receives the respective joint pin, which is bolted to the body during backrest assembly.

3. The seat according to claim 2, wherein each fastening element pivots with respect to the respective lateral support and has one extremity shaped as a hook, presenting an internal convex surface and an external edge surface, which co-operate with the bushing of the respective joint pin to lock the pin in said slot, respectively either in one position at the extremity of the slot or the other, also ensuring an automatic recovery of play for silent device operation.

4. The seat according to claim 3, wherein each elastic device comprises a wire spring wound on an auxiliary pivoting pin of the respective fastening element, which extremities are fastened respectively to the respective fastening element and to the respective lower lateral support.

5. The seat according to claim 3, wherein each lateral support presents an auxiliary opening which engages one extremity of the respective hook portion when the respective fastening element is in its operative position.

6. The seat according to claim 1, wherein said upper fastening mechanism is shaped so as to fasten the upper part of the backrest to the body when the lower part of the backrest is arranged either in the most advanced position or in the most retracted position.

7. A seat for use with a motor vehicle having a body, the seat comprising:

a backrest frame having a lower part that is moveable with respect to the body of the motor vehicle; and a pivot mechanism including a pivot pin that is attachable to the body of the motor vehicle, a support attached to the lower part of the frame and having a slot with first and second ends for receiving the pivot pin, and a fastening element associated with the support for locking the pivot pin at either the first end or the second end of the slot so as to lock the lower part of the frame in either an advanced operative position or a retracted operative position with respect to a longitudinal direction of the motor vehicle, the pivot mechanism further allowing the frame to pivot about the pivot pin when the lower part of the frame is arranged in either the advanced operative position or in the retracted operative position.

8. The seat of claim 7 further comprising a fastening mechanism associated with the frame for fastening the frame to the body of the motor vehicle, the fastening mechanism being releasable to allow the frame to pivot about the pivot pin.

9. The seat of claim 8 wherein the fastening mechanism is shaped so as to fasten the frame to the body of the motor vehicle when the lower part of the frame is arranged in the advanced operative position or in the retracted operative position.

10. The seat of claim 7 wherein the fastening element is moveable between an operative position for locking the pivot pin at either end of the slot, and a disengaged position, and wherein the pivot mechanism further includes an elastic device for urging the fastening element toward the operative position.

11. The seat of claim 10 wherein the elastic device is a spring.

12. The seat of claim 7 wherein the pivot mechanism is configured to allow the frame to pivot about the pivot pin when the lower part of the frame is arranged in each of the advanced operative position and the retracted operative position.

13. The seat of claim 7 wherein the pivot mechanism further includes a guide bushing that extends into the slot and receives the pivot pin.

14. The seat of claim 13 wherein the support is slidable along the guide bushing.

15. The seat of claim 7 wherein the fastening element pivots with respect to the support and includes a hook portion having an internal grooved surface and an external edge surface that cooperate with the pivot pin to lock the pivot pin in the slot.

16. The seat of claim 7 wherein the pivot mechanism further includes an auxiliary pivot pin about which the fastening element pivots with respect to the support between an operative position for locking the pivot pin at either end of the slot and a disengaged position, and a spring engaged with the support and the fastening element for urging the fastening element toward the operative position.

* * * * *

UNITED STATES PATENT AND TRADEMARK OFFICE
CERTIFICATE OF CORRECTION

PATENT NO. : 6,533,341 B2 Page 1 of 1
DATED : March 18, 2003
INVENTOR(S) : Francesco Marinelli It is certified that error appears in the above-identified patent and that said Letters Patent is hereby corrected as shown below:

<u>Column 4,</u>
Line 48, delete "side" and insert -- slides -- therefor.

Signed and Sealed this

Thirteenth Day of May, 2003

JAMES E. ROGAN
*Director of the United States Patent and Trademark Office*